United States Patent [19]

Barten

[11] Patent Number: 4,779,317

[45] Date of Patent: Oct. 25, 1988

[54] AUTOMATIC MACHINE FOR MILLING DRILL POINTS ON ROD BLANKS

[75] Inventor: Herbert O. Barten, Elk Grove Village, Ill.

[73] Assignee: Continental Machine Company, Elk Grove Village, Ill.

[21] Appl. No.: 926,965

[22] Filed: Nov. 4, 1986

[51] Int. Cl.[4] .................. B23P 23/02; B65G 47/22
[52] U.S. Cl. ................... 29/33 P; 51/219 R; 198/493; 198/803.9
[58] Field of Search ............... 29/33 P, 563, 564, 729; 414/744 A; 198/803.9, 381, 389, 470.1, 493; 409/221; 51/215 AR, 215 HM, 219 R; 76/108 T

[56] References Cited

U.S. PATENT DOCUMENTS

| | | | |
|---|---|---|---|
| 2,897,635 | 8/1959 | Stephanoff | 51/219 R X |
| 3,012,454 | 12/1961 | Brodbeck | 198/803.9 |
| 3,020,998 | 2/1962 | Webb | 198/803.9 |
| 3,309,819 | 3/1967 | Gühring | 51/219 R X |
| 3,578,142 | 5/1971 | Burgess, Jr. | 198/389 |
| 3,942,236 | 3/1976 | Elmer | 29/729 |
| 4,058,236 | 11/1977 | Brennan | 198/381 X |
| 4,128,159 | 12/1978 | Pataki | 198/389 |
| 4,512,456 | 4/1985 | Peyton | 198/803.9 X |

*Primary Examiner*—William R. Briggs
*Attorney, Agent, or Firm*—Laff, Whitesel, Conte & Saret

[57] ABSTRACT

A machine for milling a drill point on the end of a screw blank has a rotary conveyor with a plurality of clamps positioned radially around the periphery of said conveyor. A stationary cam is formed around the center about which the rotary conveyor turns. A number of cam followers are mounted on the conveyor for opening and closing the clamps as a function of their instantaneous positions in the excursion of the rotary conveyor. At the discharge end of the rotary excursion, a blast of air topples the screw blank head first off the conveyor to protect the tip end from damage.

13 Claims, 3 Drawing Sheets

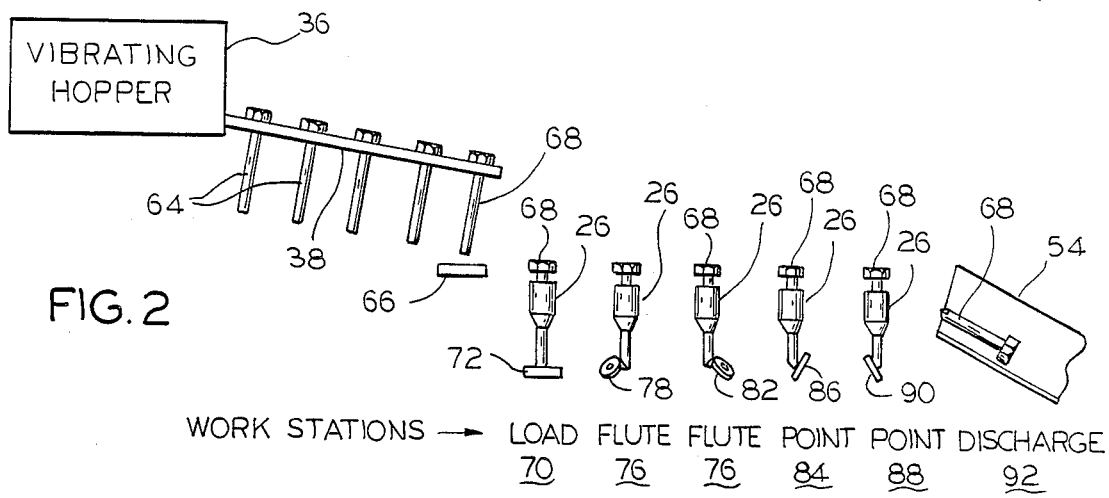
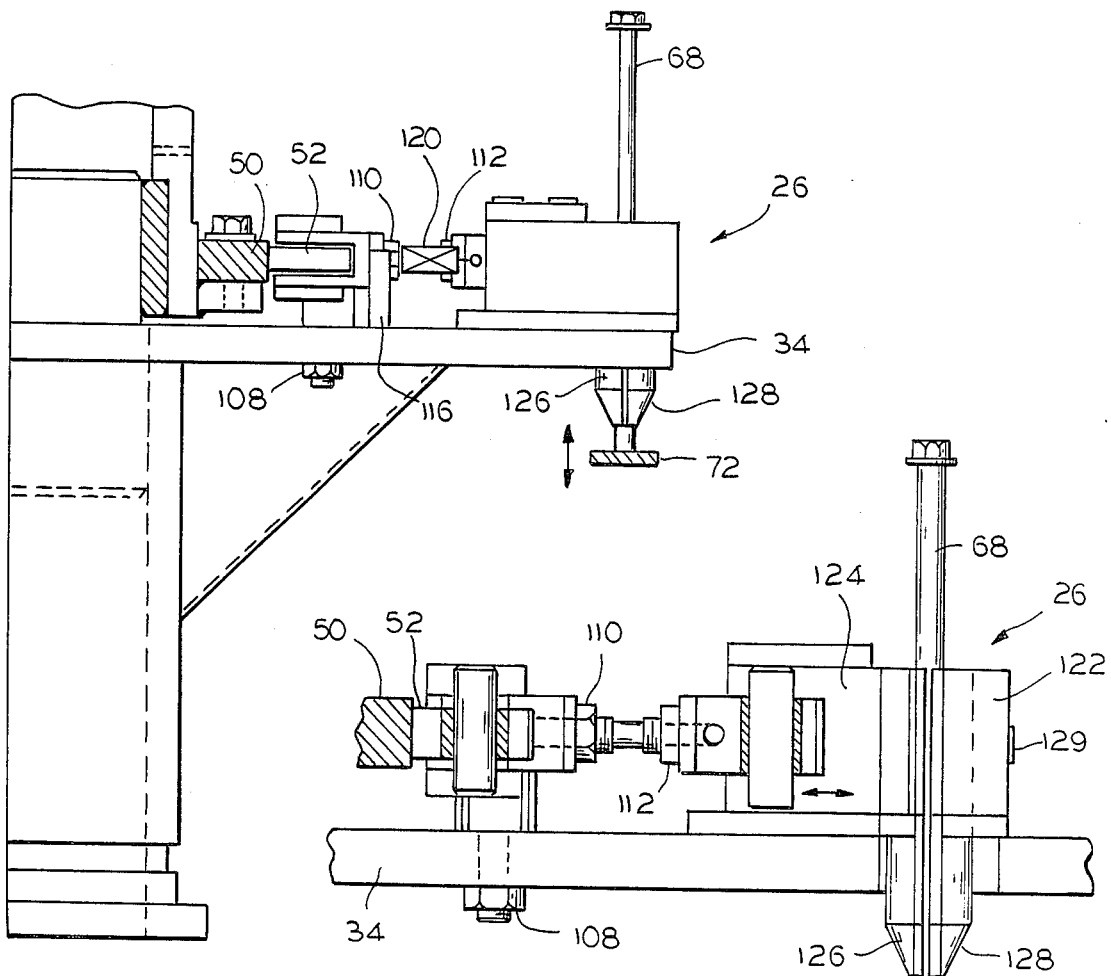

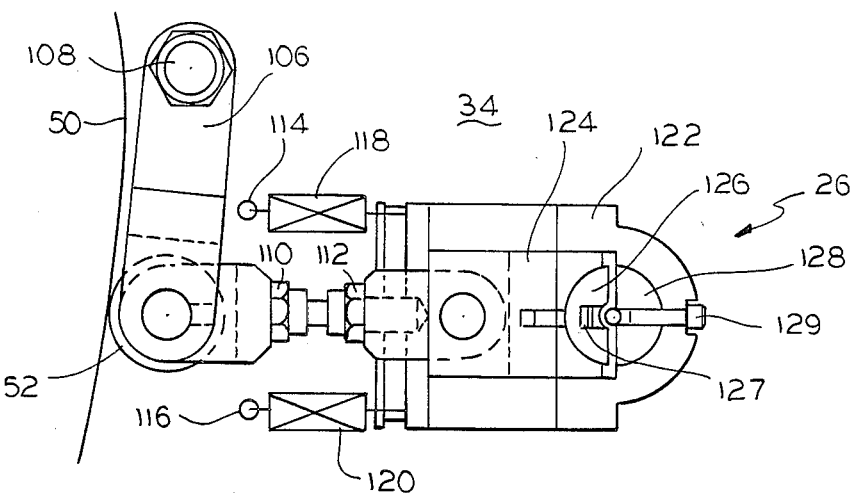
FIG. 5
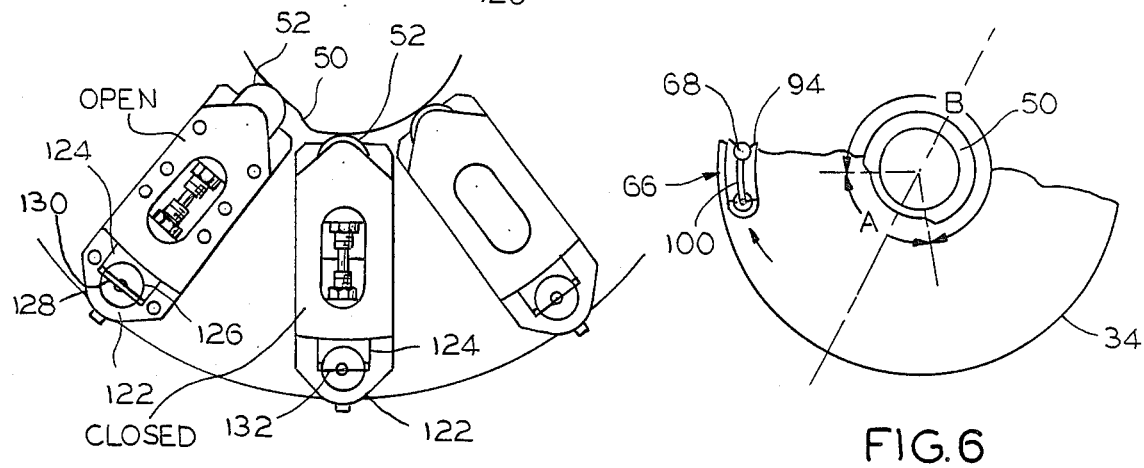
FIG. 7
FIG. 6
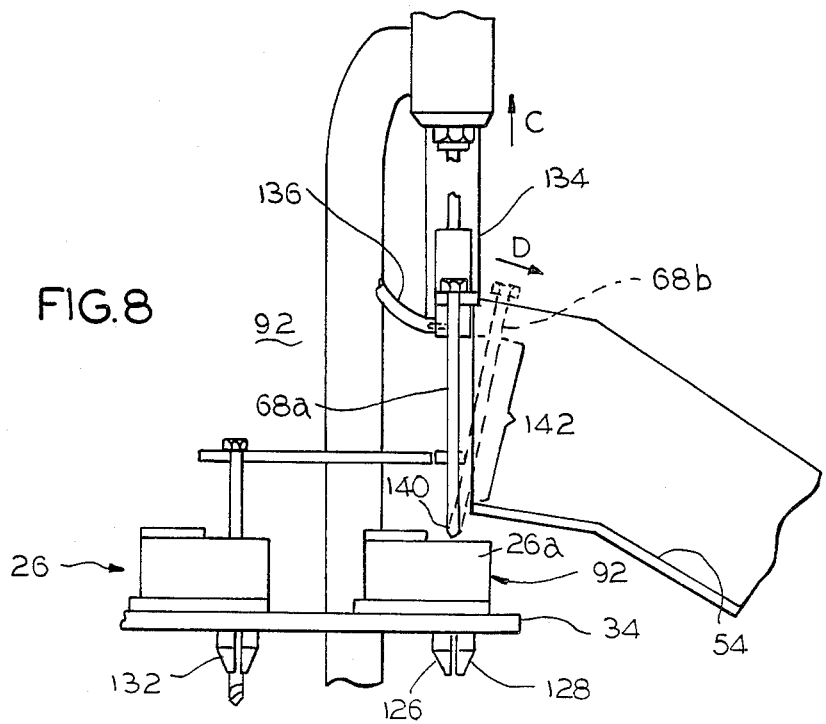
FIG. 8

AUTOMATIC MACHINE FOR MILLING DRILL POINTS ON ROD BLANKS

This invention relates to automatic machines, and more particularly, to machines for applying drill points to rod blanks, such as those used to make screws.

The exemplary screws which this invention provides are primarily large and specialized devices, designed to drill their own hole and then self-thread that hole. However, the principles of the invention may also be applied to many different devices.

By way of example, consider the roof of a building, such as one which may be used on a small office building, a garage, a bowling alley, a shopping center, or the like. Very likely, there will be a steel frame made from I-beams covered by rafters and then sheets of plywood, topped-off with a weatherproof coating. It is necessary to attach these and, perhaps, other structural elements into a single and integrated unit. Therefore, large screws, say up to twelve-inches long, may be driven through the roof and into the I-beam. The screw has a drill point which is adapted to drill its own hole; then, the threads on the screw self-tap a thread into the I-beam. Thus, there is no need to make any preliminary holes, to align parts, to form a thread in a hole, or the like.

In order to accomplish this drill and tap process, the screws are constructed somewhat similar to metal twist drills, with a screw head. The screws must be strong and hard enough to perform the drill and tap process. They must have such a low cost that they may be used only once and then left in place. Thus, as a practical matter, they have to be made on automatic machines.

The machines which have been used heretofore to make the described screws have been limited to making screws that are no longer than four-inches. There is a long screw on the market with a formed point which can drill a hole through light metals (up to 18 gauge) and three-quarters inch wood. Also, the machines which make the screws have discharged them in a manner which sometimes dulled the finished drill points. The prior art machines have been more expensive than they had to be, primarily in their ability to pick up and grip the rod blanks that are used to make the screws.

Accordingly, an object of the invention is to provide new and improved machines for making drill points on rod blanks. Here, an object is to place drill points on screws which are used to drill and tap holes.

Another object of the invention is to provide new and improved means for selecting and moving rod blanks from work station to work station and then for discharging pointed blanks without damage to the points.

In keeping with one aspect of the invention, these and other objects are accomplished by providing a rotary conveyor. A cam is positioned near the center of rotation of the conveyor to control a plurality of clamps which seize the rod blanks and carry them along. The drill point is milled onto each blank as the conveyor rotates. Then, the pointed blank is released in a manner which causes it to topple head first into a discharge chute, thereby preventing it from landing on and dulling the point.

A preferred embodiment of the invention is shown in the attached drawings, wherein:

FIG. 1 is a front elevation of a milling machine incorporating the invention;

FIG. 2 schematically illustrates the operation of the machine of FIG. 1, which incorporates the invention;

FIG. 3 is a side elevation of the inventive part of the machine of FIG. 1;

FIG. 4 is a more detailed showing of the part in FIG. 3;

FIG. 5 is a plan view looking down on the top of FIG. 4;

FIG. 6 is a plan view of a pick-up device and a cam on a rotary conveyor;

Figure 1:
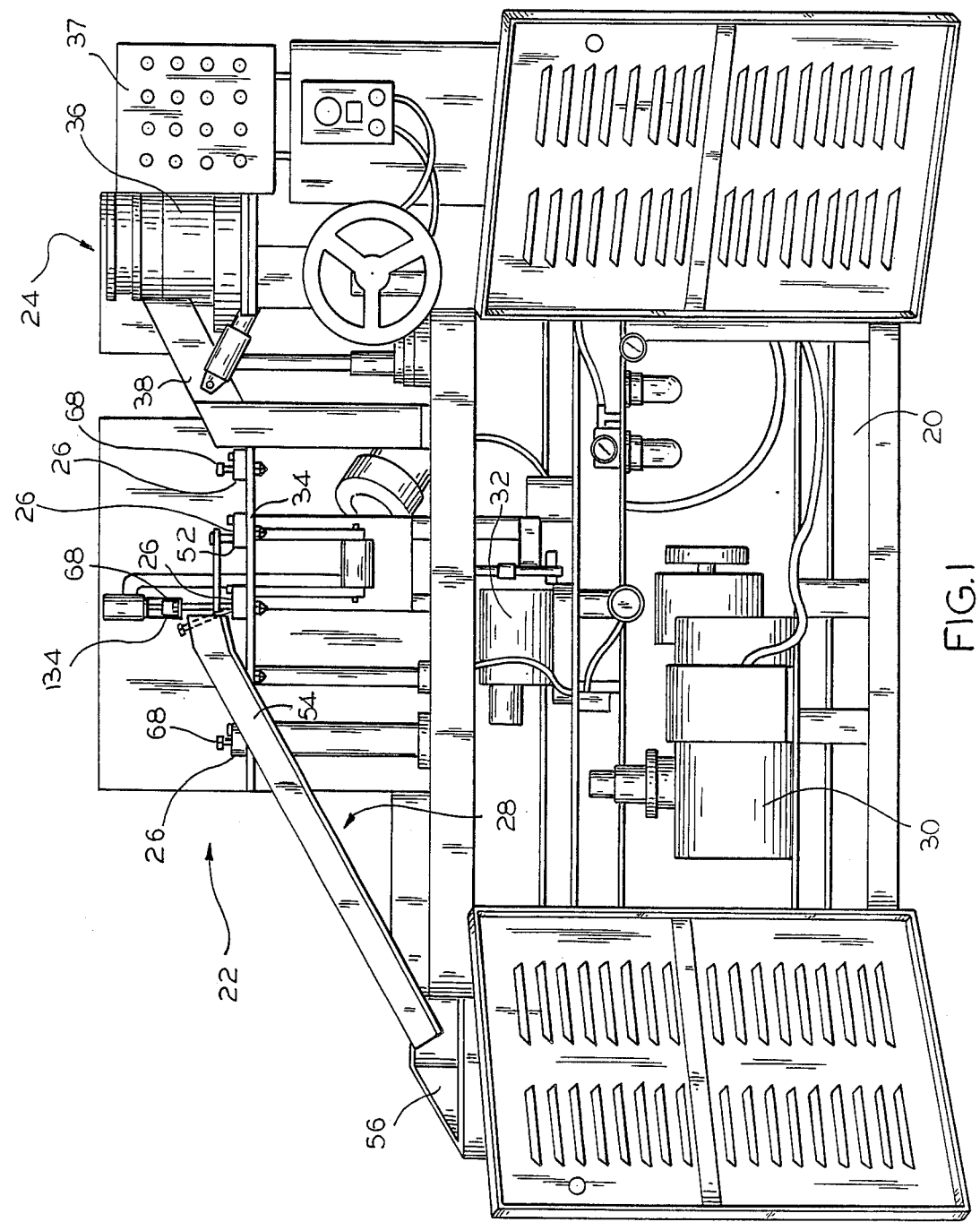

FIG. 7 schematically shows opened and closed conditions of the clamp that holds the rod blanks; and FIG. 8 illustrates the manner of discharging a screw blank which has been given a drill point by the inventive machine.

FIG. 1 shows the inventive machines as having a housing 20 with a superstructure 22, which contains a feeder 24, a plurality of clamps 26, and a discharge mechanism 28. The housing contains an electric motor 30 and a transmission 32 for transferring the motive power of the motor to a rotary conveyor 34 which supports clamps 26 and to equipment at a plurality of work stations. The entire machine is controlled from a control panel 37. If desired, a microprocessor may be programmed to control all functions.

In general a hopper 36 contains a plurality of rod blanks which are delivered down a chute 38 to a pick-up station where they are deposited in clamps 26 on the rotary conveyor 34. The individual rod blanks are each inserted into a clamp 26 which carries the blank around an excursion determined by the rotation of the conveyor. A stationary cam 50 (FIG. 6) is positioned at the center of rotation about which the conveyor 34 turns. Each of the clamps is individually opened and closed by its own cam follower 52, depending upon the instantaneous rotary position of the clamp in its excursion on the conveyor 34.

At the end of the excursion, the rod blank is discharged through a chute 54, to a collection bin 56. Upon its discharge from conveyor 34, the rod blank is made to topple head first off the conveyor. Therefore, as the rod blank falls head first onto the chute 54 and into the bin 56, the opposite end of the rod blank, which has been given a drill point, is protected.

The various work stations and the operation of the inventive machine are schematically shown in FIG. 2. In another operation which has been carried out before the rod blank reaches the inventive machine, a drill rod has been sawed into discrete lengths corresponding to the desired screw length. Any suitable head has been formed on one end of the resulting screw length, rod blank.

These partially preformed rod blanks are dumped into a vibrating hopper 36, of a known design. As the hopper vibrates, the rod blanks tumble around until they find their way out an opening in a uniform alignment with a guide rail 38, from which the blanks hang by their heads, with their shanks down, moving toward a pick-up position.

At the end of the guide rail 38 (FIG. 2), a pick-up device 66 picks up an individual blank 68 and delivers it to a loading station 70, where it bottoms on a blank stop 72, and a clamp 26 locks it in position. Rotary conveyor 34 (FIG. 1) sequentially moves a plurality of the clamps 26 and, therefore, the rod blanks 68, past a number of work stations. At work station 76, a cutter 78 mills a flute on one side of the rod blank 68, and a second cutter 82 mills a flute on the opposite side of the tip of blank 68. At work station 84, a cutter 86 mills a point with a cutting edge on one side at the end of the rod blank 68. At work station 88, a second grinding wheel 90 forms a point with a cutting edge on the opposite side of the end of blank 68. At the discharge work station 92, the clamp 26 releases the rod blank 68 in a manner which causes it to topple head first into chute 54 from which it moves out of the machine and into bin 56 (FIG. 1) with the pointed end of the blank trailing, so that it will not be damaged.

Thereafter, a separate machine (not shown) rolls a self-tapping screw thread onto the rod blank. When the screw is used, the drill tip which is milled, as shown in FIG. 2, drills a hole, and the thread which is rolled onto the blank both carries away the chips resulting from the drilling operation and self-threads its way through the hole which the drill tip formed.

FIGS. 3-5 show the details of one of a plurality of clamps 26, which are distributed around the periphery of the circular conveyor 34. FIGS. 3 and 4 show the specific example of a clamp 26 positioned in the load station 70, of FIG. 2.

The pick-up device 66 is shown in FIG. 6, as being positioned on the periphery of circular conveyor 34, which rotates intermittently to transport the rod blanks past the work stations represented in FIG. 2. At 94, there is a funnel-shaped opening leading into a slot 100 which picks up a rod blank 68 as the conveyor 34 turns slot 100 past the end of the guide rails 38 (FIGS. 1, 2), the rod blank being guided by funnel 94 into the slot 100. Thereafter, the conveyor 34 carries the rod blank 68 to the next work station.

The clamp assembly 26 is controlled by a cam follower 52 riding against a stationary cam 50 about which the conveyor 34 rotates. The cam follower 52 is a wheel mounted on the end of clamp guide bracket 122 (FIG. 5) fixed to the rotary conveyor 34 by means of bolts.

As best seen in FIGS. 5, 6, the cam follower 52 includes a wheel which follows the profile of cam 50 to move toward and away from the clamp 26. The follower stroke or movement is adjusted relative to the position of clamp 26 by means of an adjustment of two nuts 110, 112, so that in the closed position of the clamp, the jaws are adjusted very precisely.

Two supporting studs for return springs 114, 116 are fastened to conveyor 34 and positioned on opposite sides of the clamp 26, as best seen in FIG. 5. A pair of return springs 118, 120 extend between the studs 114, 116 and jaws of the clamp 26. Thus, when the cam follower 52 pushes the clamp jaws to a closed position, it also stretches the return springs 118, 120. When the cam follower reaches the part of the cam profile which enables the clamp tools to open, the return springs 118, 120 cause them to also open.

The clamp 26 includes a clamp guide bracket 122 (FIG. 5) inside which a clamp holder 124 slides. Opposing tools 126, 128 are secured to the clamp guide bracket 122 and to the clamp holder slide 124 by locking screws 127, 129. As best seen in FIGS. 3, 4, the tools have a substantial vertical dimension so that the rod blank 68 is held in a stable, vertical position.

The means for operating the tools is illustrated in FIGS. 6, 7. While the cam follower 52 (FIG. 7) is riding on segment A of cam 50, the clamp holder 124 is pulled back by return springs 118, 120 (FIG. 5) to open the tools, as shown at 130 (FIG. 7).

In this open position, the rod blank 68 may drp through the open tools as far as permitted by a blank stop 72 (FIG. 3). Then, the cam follower 52 enters upon a segment B of the cam 50 (FIG. 6). This pushes the clamp holder 124 (FIG. 7) to a position which closes the tools, as shown at 132.

At the discharge station 92 (FIGS. 2 and 8), a pair of lift fingers 134 grip the head of the rod blank 68a and lift it (direction C), as the jaws 126, 128 open. Thus, the screw blank 68a is freed from the clamp 26a, as shown by solid lines at 68a. Then, a blast of compressed air is fed through tubing at 136 to push the head of the rod blank 68 in direction D. As shown by dashed lines at 68b, the rod blank topples over so that its head strikes the discharge chute 54 and the collection bin 56 (FIG. 1) at the bottom of the chute 54. This toppling motion prevents the drill point on the rod blank from striking the chute or anything at the bottom of the chute, thereby preventing dulling or damage of the point of the drill bit formed at the end of the rod blank.

After the rod blank leaves the chute 54, it is transported to another machine which adds self-tapping screw threads along the length 142 of the rod blank. Thereafter, the rod blanks may be given a hardening and plating treatment to impart a metal cutting capability to the screw threads. This treating, hardening, and plating operation is not part of the invention.

The invention has a number of advantages. The prior art machines used air cylinders to grip the rod blanks, which was expensive, required adjustments, and controls. The invention uses a cam which is low cost, automatically synchronized with the conveyor and coordinated with the work station positioning, and does not tend to lose adjustment. The ejection by toppling prevents damage to the drill point on the end of the rod blank. The machine may apply a drill tip to blanks of any suitable length. The inventive holding device eliminates the need for cups and collets that the prior art required to guide the screw blank into a captured and clamped position.

Those who are skilled in the art will readily perceive how to modify the invention. Therefore, the appended claims are to be construed to cover all equivalent structures which fall within the true scope and spirit of the invention.

The invention claimed is:

1. A machine for milling drill point tip ends on rod blanks, said machine comprising means for picking up individual rod blanks and for delivering them to a load position, clamping means at said load position for clamping an individual rod blank in a locked position, a circular turntable type of conveyor means mounted to turn about a center axis for carrying said clamping means with said rod blanks clamped in said locked position past at least one work station to a discharge station, a stationary cam centered on said axis for operating a cam controlled means responsive to the turning of said conveyor means, and cam controlled means also centered on said axis and carried by said conveyor to be operated responsive to an excursion of said conveyor means as it carries said clamping means for closing said clamp means at said load position and for opening said clamp means at said discharge station, said clamping means comprising a clamp guide member and a clamp slide member, said slide member moving radially across said conveyor means responsive to said cam controlled means, and a pair of tools for gripping rod blanks responsive to a movement of said clamp slide member relative to said clamp guide member.

2. A machine for milling drill point tip ends on rod blanks, said machine comprising means for picking up individual rod blanks and for delivering them to a load position, clamping means at said load position for clamping an individual rod blank in a locked position, conveyor means for carrying said clamping means with said rod blanks clamped in said locked position past at least one work station to a discharge station, cam controlled means operated responsive to an excursion of said conveyor means as it carries said clamping means for closing said clamp means at said load position and for opening said clamp means at said discharge station, and means at said discharge station synchronized with said opening of said clamping means for delivering a blast of compressed air against an end of said rod blank for toppling said rod blank out of said locked position, whereby a particular end of said rod blank always falls head first as said blank is discharged.

3. A machine for milling ends on rods, said machine comprising circular conveyor means mounted for turning about its center of rotation to transport rod blanks past a plurality of work stations, at least one clamp means mounted on and travelling with said conveyor means, said clamp means having a pair of tools for holding said rod blanks in a predetermined work position relative to said circular conveyor, stationary cam means surrounding said center of said conveyor means, the cam means having a profile which is coordinated with locations of said work station, and cam follower means mounted on said circular conveyor and responding to said profile of said cam means for opening and closing said tools relative to the position of said clamp means in coordination with said work stations.

4. The machine of claim 3 wherein there are a plurality of said clamp means, each of said clamp means comprising a clamp guide bracket lying along a radius of said conveyor means and carrying one of said pair of tools, a clamp slide mounted for movement within said clamp guide bracket and for carrying the other of said pair of tools, said tools reciprocally moving relative to each other responsive to said cam follower means, whereby each of said rod blanks is gripped or released as a function of its rotary position in said turning about said center of rotation and, therefore, as a function of the work station where said clamp means is located.

5. The machine of claim 4 and means for aligning and feeding said rod blanks toward said conveyor means, pick-up means for transferring said rod blanks from said aligning and feeding means to said clamp means, and means responsive to said cam follower means for closing said tools to capture and hold said rod blanks after said pick-up means has transferred said rod blanks to said clamp means.

6. A machine for milling ends on rods, said machine comprising circular conveyor means mounted for turning about its center of rotation to transport rod blanks past a plurality of work stations, a plurality of clamp means mounted on and travelling with said conveyor means, each of said clamp means having a pair of tools for holding said rod blanks in a predetermined work position relative to said circular conveyor, stationary cam means surrounding said center of said conveyor means, the cam means having a profile which is coordinated with locations of said work station, cam followers means mounted on said circular conveyor and responding to said profile of said cam means for opening and closing said tools relative to the position of said clamp means in coordination with said work stations, each of said clamp means comprising a clamp guide bracket lying along a radius of said conveyor means and carrying one of said pair of tools, a clamp slide mounted for movement within said clamp guide bracket and for carrying the other of said pair of tools, said tools reciprocally moving relative to each other responsive to said cam follower means, whereby each of said rod blanks is gripped or released as a function of its rotary position in said turning about said center of rotation and, therefore, as a function of the work station where said clamp means is located, wherein work performed at said work station is on one end of each of said rod blanks, means for lifting said rod blanks at a discharge work station, means responsive to said cam follower means for opening said tools after said rod blanks are in the control of said lifting means, and means for thereafter toppling said rod blanks out of said lifting means to cause the end of each of said rod blank which is opposite said one end to fall first, thus protecting the work which was performed on said one end at said work station.

7. The machine of claim 6 wherein said means for toppling each rod blank comprises means for directing a blast of compressed air toward an end of said rod blank when said blank is in a lifted position.

8. The machine of claim 7 wherein said rod blank is a screw with a head preformed thereon, said work performed on said one end comprises forming a pair of opposing flutes and a pair of cut-off sides with cutting edges, said flutes and sides together forming a drill point.

9. The machine of claim 4 wherein each rod blank is a screw with a head preformed on one end and work performed on said rod blank at said work station is at the other end of said blank, said work comprising forming a pair of opposing flutes and a pair of cutting edges, said flutes and edges together forming a drill point.

10. The machine of claim 9 wherein said conveyor rotates in a horizontal plane and each of said tools has a substantial vertical dimension for holding a rod blank in a vertical position with said screw head being held in an uppermost position, said conveyor moving said rod blank past a pick-up work station, a work station for milling a first flute on one side of the tip, a work station for milling a second flute on an opposite side of said tip, a work station for milling a first cutting edge on one side of said tip, a work station for milling a second cutting edge on an opposite side of said tip, and a work station for discharging said blank.

11. A machine for milling ends on rods, said machine comprising circular conveyor means mounted for turning about its center of rotation to transport rod blanks past a plurality of work stations, a plurality of clamp means mounted on and travelling with said conveyor means, each of said clamp means having a pair of tools for holding and rod blanks in a predetermined work position relative to said circular conveyor, stationary cam means surrounding said center of said conveyor means, the cam means having a profile which is coordinated with locations of said work station, cam followers means mounted on said circular conveyor and responding to said profile of said cam means for opening and closing said tools relative to the position of said clamp means in coordination with said work stations, each of said clamp means comprising a clamp guide bracket lying along a radius of said conveyor means and carrying one of said pair of tools, a clamp slide mounted for movement within said clamp guide bracket and for carrying the other of said pair of tools, said tools reciprocally moving relative to each other responsive to said cam follower means, whereby each of said rod blanks is gripped or released as a function of its rotary position in said turning about said center of rotation and, therefore, as a function of the work station where said clamp means is located, each rod blank being a screw with a head preformed on one end and work performed on said rod blank at said work station is at the other end of said blank, said work comprising forming a pair of opposing flutes and a pair of cutting edges, said flutes and edges together forming a drill point, said conveyor rotating in a horizontal plane and each of said tools having a substantial vertical dimension for holding a rod blank in a vertical position with said screw head being held in an uppermost position, said conveyor moving said rod blank past a pick-up work station, a work station for milling a first flute on one side of the tip, a work station for milling a second flute on an opposite side of said tip, a work station for milling a first cutting edge on one side of said tip, a work station for milling a second cutting edge on an opposite side of said tip, and a work station for discharging said blank, and means at said discharging work station for directing a blast of compressed air toward the head end of said rod blank, whereby said rod blank topples head first, thus protecting said tip.

12. A machine for milling a drill point on an end of a screw blank, said machine comprising a rotary conveyor with a plurality of clamps positioned around the periphery of said conveyors, a stationary cam formed around the oenter about which the rotary conveyor turns, a number of cam followers mounted on the conveyor for opening and closing the clamps as a function of their instantaneous positions in the excursion of the rotary conveyor, and means at the discharge end of the rotary excursion for directing a blast of air against said screw blank for toppling it off the conveyor to protect the tip end of said blank from damage.

13. The machine of claim 12 and means for milling a drill point on said screw blank as said conveyor rotates.

* * * * *